Feb. 10, 1948. M. BEAN 2,435,643
METHOD OF MOLDING FLEXIBLE PATTERNS
Filed May 18, 1943 2 Sheets-Sheet 1

Inventor
Morris Bean
By
Attorney

Feb. 10, 1948.  M. BEAN  2,435,643
METHOD OF MOLDING FLEXIBLE PATTERNS
Filed May 18, 1943  2 Sheets-Sheet 2

Inventor
*Morris Bean*

By

Attorney

Patented Feb. 10, 1948

2,435,643

UNITED STATES PATENT OFFICE 2,435,643

METHOD OF MOLDING FLEXIBLE PATTERNS

Morris Bean, Yellow Springs, Ohio

Original application August 1, 1940, Serial No. 349,032. Divided and this application May 18, 1943, Serial No. 487,527

4 Claims. (Cl. 18—55)

This invention relates to methods and molds for making patterns for use in molding of plaster and the like.

For a long time, in the art of molding, the advantages of using a flexible material for a pattern or mold have been recognized. Such flexible material can be pulled away from undercut places without damage either to itself or the material molded against it, or to the material it is molded in, as the case may be. Hence, complex forms or shapes can be made, particularly of plaster of Paris, from a single pattern or mold, where a complex pattern or mold of many parts would have to be used if it were made of a rigid material.

The advantages to be gained in the use of flexible patterns are of particular interest for making molds bonded with plaster of Paris. It is a well known fact that mold materials containing a substantial proportion of plaster of Paris can be gauged with water and made to flow in around the pattern as a fluid plastic, which will subsequently "set" within a short space of time to a rigid solid having high strength and resistance to disintegration from mechanical abrasion.

The formation of such flexible patterns is clearly of great importance since it is apparent that a molded shape derived from a flexible pattern can have an accuracy of configuration no greater than that of the pattern from which it is prepared. Flexible patterns are usually made by pouring flexible material, while in a plastic condition, into a mold cavity of the desired configuration. Thereafter, the flexible material is allowed to somewhat harden and is then separated from the master mold. Heretofore, considerable difficulty has been encountered during the hardening of the flexible material and in separating the same from the master mold because of shrinkage which has resulted in irregularities in the pattern surface.

It is accordingly an object of my invention to overcome these disadvantages and to provide a pattern structure free of irregularities and which is adapted to reproduce form and dimensions accurately in a large number of casts made upon it.

Another object of the invention is to provide a novel and economical method for producing the pattern in such a way as to avoid irregularities in the configuration sought.

Other objects and advantages will be apparent to those skilled in the art from the following specification.

I have overcome the difficulties set forth above by a number of expedients which advantageously are used together, but which may also be used independently with improvement over patterns known prior to my invention.

Various flexible moldable materials may be used for my invention, but I have found great advantage in the use of a particular material known as "Korogel" or "Koroseal," available commercially under these names from the B. F. Goodrich Rubber Company. This is understood to be a vinyl chloride gel plasticized with cresyl phosphate, which is more particularly described in the Journal of Industrial and Engineering Chemistry, vol. 27, June, 1935, pages 667 to 672. Other resiliently elastic thermoplastic materials may be used, however. Soft rubber, with or without vulcanizing, may be used. The various synthetic rubber-like materials including, for example, "Duprene," "Thiokol," and various polymerization products.

I have found in the production of patterns from this and other thermoplastic materials that there is a relatively high contraction of the material after it is injected into the mold and while it is cooling, and that this tends to draw the material away from the surface which is to be reproduced by the pattern with formation of objectionable irregularities on the pattern surface. This I have now been able to overcome by treating the respective surfaces of the mold so that the thermoplastic material adheres more strongly to the surface which is to be reproduced than to the back of the mold in which it is formed. Thus I may coat the face of the mold to increase the adhesion, provided that it is not increased in such a way that the pattern cannot subsequently be removed from the mold; or, more advantageously, I may treat the back of the mold so as to permit the material on contracting to draw readily away from the back and thus to exert little or no retractile force on the surface which is to be molded. Advantageously, I treat the surface which is to be reproduced by a material which facilitates removal but to which the thermoplastic material adheres substantially. When the face of the mold is made of a porous material such as plaster composition, I have found it particularly advantageous to use impregnation of the mold face with a hard wax, such as montan wax, and advantageously a partially refined montan wax, e. g. a mixture of 50% refined and 50% unrefined, or the surface may be impregnated with a solution of a phenolic condensation resin or other suitable hard resin. The material chosen for this purpose is one which impregnates and flows easily at a temperature which does not dehydrate the plaster; advantageously, as in the case of montan wax, it is one which deters dehydration of the plaster by the hot thermoplastic molded upon it; it should be a material the excess of which can be easily wiped off the surface of the plaster to leave a clean, smooth face; it should not soften at the temperature reached when the hot thermoplastic is molded on its surface; it should not adhere to the thermoplastic so strongly as to make difficulty in stripping off the molded thermoplastic; and its contraction on solidification and/or cooling should be sufficiently low so that it does leave voids.

For the back I have found most suitable a thin metal foil to which the thermoplastic may adhere but which flexes easily away from the back of the mold, or I may dust the back of the mold with talc, or graphite, or may treat it with an insoluble soap or other material to which the thermoplastic does not readily adhere.

In making a Korogel pattern, the following general procedure is to be followed:

The Korogel is heated to a temperature sufficiently high so that it becomes fluid and is poured or otherwise injected into the mold cavity between these treated surfaces and then allowed to cool. During the cooling and solidification of the Korogel there is relatively large contraction, which due to the treatment of the mold surfaces is accommodated entirely at the back of the mold, since the Korogel material is held more strongly at the face than at the back; and as a consequence the Korogel remains molded accurately to every fine detail of the face of the mold.

After the Korogel is solidified, the mold may be opened by removing the back, i. e. the part treated for lesser adhesion. The resulting pattern may thereafter be stripped from the face without injury, due to the mild adhesion between the Korogel and the wax impregnated surface. Advantageously, however, it is left in this mold until the rigid back is applied and set.

If a metal foil has been used in the mold as a means of reducing the hold of the Korogel on the back of the mold, this may be stripped off or left on the back of the pattern, and in the latter case will serve as a barrier against fugitive ingredients which might otherwise be absorbed out of the Korogel or other thermoplastic composition into the plaster backing by capillary action as more particularly set forth and claimed in my copending applications, Serial No. 349,032, filed August 1, 1940, and Serial No. 487,528 filed herewith, now Patent No. 2,402,528.

My invention is applicable as well to molds for making positives as to patterns for making negative impressions for molding positives. The difference is essentially one of design of the product and use which does not fundamentally affect the operation of this invention. I shall, therefore, use the word "pattern" to include both types without reference to the technical distinction between "patterns" and "molds." It should be remembered, however, that a molding technique is used in making these flexible patterns. The mold used in making a pattern out of a thermoplastic material is not to be confused in this discussion with such flexible molds herein referred to as "patterns" or with molds which may be made from the pattern after it is finished.

The invention here described may advantageously be used in conjunction with the inventions described and claimed in my copending applications Serial No. 349,032, filed August 1, 1940, and Serial No. 487,528 filed herewith, now Patent No. 2,402,528. It is so described in the example given below.

Although in the accompanying drawings I have shown a preferred embodiment of my invention and have described the same and various modifications thereof in this specification, it is to be understood that these are not intended to be either exhaustive or limiting of the invention, but, on the contrary, are chosen for the purpose of illustrating the invention in order that others skilled in the art may so fully understand the invention, its principles and the application thereof, that they may embody it and adapt it in numerous forms, each as may be best suited to the requirements of its particular use.

Referring to these drawings.

Figure 1:
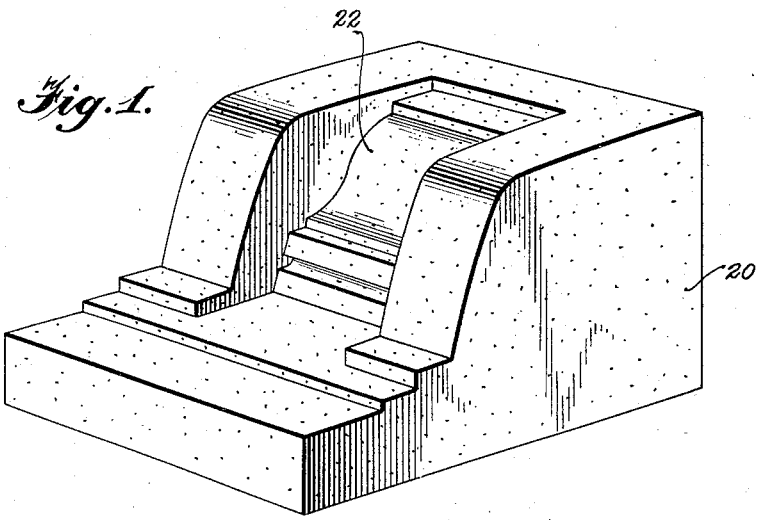
Figure 1 is a perspective view of a negative impression mold used as a master mold in forming flexible patterns.
Figure 2:
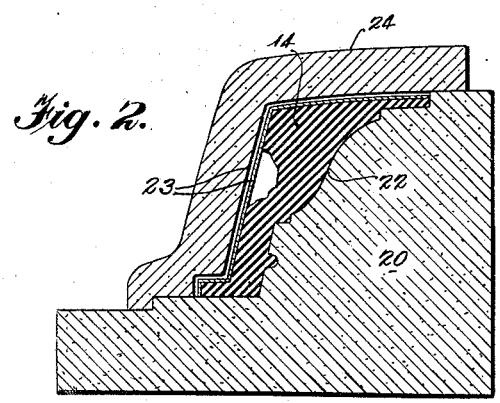
Figure 2 is a view in section of the master mold of Figure 1 showing the formed pattern in position and somewhat shrunken away from the backing.
Figure 3:
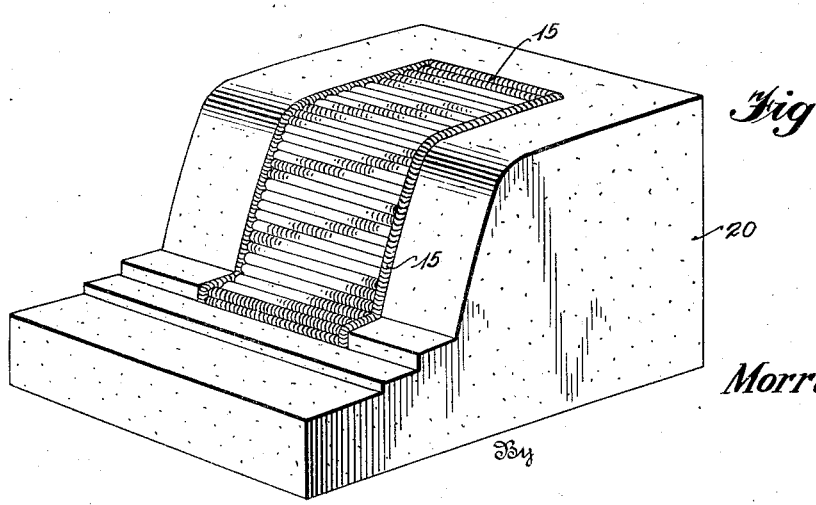
Figure 3 is a perspective view of the back of the flexible pattern still in place on the negative impression mold and with the anchoring coils affixed in the back of the pattern ready for application of the hardenable backing material.

In Figures 1, 2 and 3 I have shown the pattern and certain steps and apparatus used in its manufacture. Figure 1 shows the mold in which the thermoplastic is formed and given the desired pattern surface. In this I have used a negative impression mold 20, which may be modeled or carved in plaster, clay, hard wax, wood or other suitable material, or may be shaped by molding directly onto a surface which is to be reproduced in the pattern, for example, a plaster cast of the original. The surface of the mold cavity, particularly if a porous material such as plaster is used, is preferably impregnated with a high melting point wax, such as montan wax, advantageously a partially refined montan wax, or a phenolformaldehyde condensation resin such as Bakelite varnish may be used satisfactorily, to give a mold adhesion at the pattern face sufficient to prevent the Korogel from drawing away from the pattern face while it is congealing and yet adapted readily to be freed from the Korogel after it has congealed.

Other coatings or lubricating materials can be used on the face of the pattern mold instead of the wax or varnish; for example, the molds may be dusted with graphite, talc or bronzing powder, but always the treatment of this mold face at 22 is to be so related to the treatment of the face (at 23) of the back 24 as to have a substantially greater adhesion to the thermo-plastic molded in the cavity.

To this end, I preferably cover the back surface (at 23) of the cavity, away from the molding face 22, with a metal foil 23 which is free to pull away from the mold face proper and thus to accommodate the entire shrinkage of the thermo-plastic at the surface thus covered with foil. Other coatings than foil may be used for this purpose also. For example, a heavy coating of lubricating material such as graphite, talc or bronzing powder, may be used provided always that the adhesion at the molding face 22 is kept stronger than the adhesion at the face 23 where contraction is to be concentrated.

With the mold parts assembled, as shown in Figure 2, the hot fluid thermo-plastic is poured or otherwise injected into the mold, preferably under a substantial pressure, and is allowed to congeal and cool in the mold. After cooling the pattern is stripped from the mold and is then provided with the anchoring means in the manner illustrated in Figure 3.

In Figure 3, I have shown the completed flexible portion of the pattern with coils of wire 15 laid over its back and distributed over substantially the entire area of the back. These coils are then heated, for example, by pressing with a hot plate, by passing a resistance electrical current through them, or by means of a fine Bunsen flame or otherwise, until a part of each turn is embedded in the thermo-plastic material; but leaving a part of these turns projecting from the back, as shown in Figure 3, for example, and the turns spaced for a plaster key.

Either before or after the application of the coils 15 an impervious coating may be applied to the back. If the metal foil has been used in the mold it may be left in position, but may make difficulty in applying the coils 15 unless the surfaces of the coil are sufficiently rough to puncture the foil or the foil is otherwise ruptured at the points where the coils contact.

Figure 4:
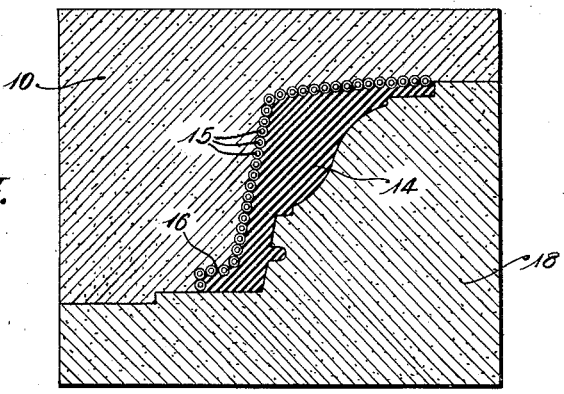
Figure 4 is a view in cross section of the pattern of Figure 3 after the cementitious backing has been applied but before the removal of the negative impression mold.

The pattern with these anchoring coils 15 and the impervious backing 16 is ready for application of the rigid backing 10. This I do preferably by placing the pattern thus prepared face down in a suitable mold and casting a plaster mix onto its back, thus forming in situ the rigid backing by which the flexible pattern is supported throughout its use, see Figure 4. The plaster mix or other plastic used for this purpose should be sufficiently fluid to flow around the wires of the coils 15 or other anchoring means or should be tamped lightly to force it around the anchoring means but at the same time to avoid distortion of the pattern.

When the backing has set the pattern with its backing keyed thereto throughout its area may be removed from the mold and is ready for use.

Figure 5:
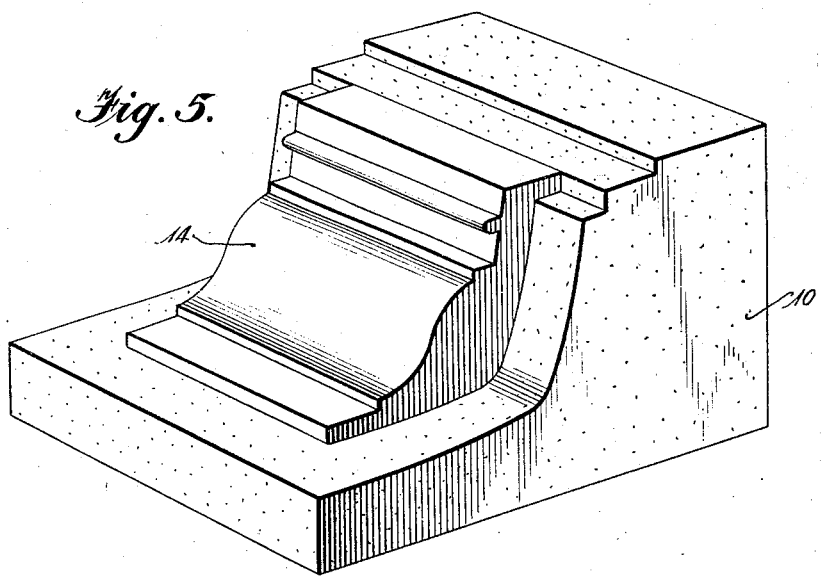
Figure 5 is a perspective view of the flexible pattern and backing after removal of the negative impression mold.

In Figure 5, I have shown a finished pattern assembled on its rigid backing which constitute together a pattern for molding plaster and the like, e. g., in the manufacture of plaster molds for metal casting. The rigid backing shown at 10 is, in the preferred case, made of plaster, cast in situ onto the back of the flexible pattern 14, which, as already stated above, in the preferred case, is composed of Korogel. At 15, I have shown the wire coils, mentioned above, by which the pattern 14 is anchored to the rigid backing 10, and at 16 between the backing 10 and the pattern 14 is a layer of impervious material, advantageously paraffin wax.

The plaster body 18 is made by pouring the plaster over the pattern 14, as is well known in connection with ordinary plaster molding technique. When the plaster has set and the molding is, therefore, complete, the flexible pattern 14 is readily stripped from the molded article by reason of its smooth surface and its resilient flexibility, whereas, it is held securely to the rigid backing 10 by means of the anchoring means 15; and, by reason of the distribution of these coils, the stripping of the flexible material from the mold takes place without any concentration of the stresses which might tear or permanently deform the flexible pattern.

Figure 6:
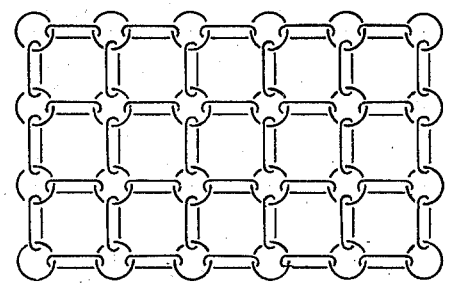
Figure 6 is a plan view showing a chain link fabric which may be used instead of wire coils for bonding the flexible pattern to its backing.

In Figure 6, I have shown another example of an anchoring means suitable for use in my invention. This is a chain mail fabric, which can be partially embedded in the thermo-plastic and the backing in the same way as the wire coils already described. It has the advantage that it can be cut to the size and shape of the back of the mold, laid over it and heated to embed itself in the mold all with somewhat less labor than with the coils.

This application is a division of my prior application Serial No. 349,032, filed August 1, 1940, now Patent No. 2,349,806.

What I claim is:

1. The method of making a pattern of a flexible resilient thermo-plastic which comprises forming a rigid negative impression mold with a face adapted to form the molding face of the pattern and to adhere yieldably thereto, forming a complementary rigid mold part with a surface adapted to form the back of the pattern, applying on said back-mold surface a thin covering adapted to hold the thermo-plastic material substantially less strongly than said face of the negative impression mold, whereby contraction of the material upon cooling is accommodated substantially entirely by retraction from said back mold surface, assembling said molds to form a cavity corresponding substantially to the desired pattern, injecting said thermo-plastic in a heated fluent condition into the cavity and solidifying the thermo-plastic therein by cooling.

2. The method of making a pattern of a flexible resilient thermo-plastic which comprises forming a negative impression mold of plaster of Paris, coating the face of said impression mold with a material to which the thermo-plastic adheres mildly, placing over said impression mold a backing mold adapted to complete a mold cavity, covering the face of said backing mold with a flexible sheet substantially non-adherent to said backing, impervious to the thermo-plastic and capable of flexing upon application of a force per unit area, exerted in a direction transverse to its surface, less than the force per unit area, exerted in the opposite direction, which would be necessary to break adhesion of the thermo-plastic to the coated impression face, and injecting the thermo-plastic in a hot fluid condition into said mold cavity and cooling it to a solid resilient condition therein.

3. The method of making a pattern of a vinyl chloride gel thermo-plastic which comprises forming a negative impression mold, coating the face of said impression mold with a phenolic resin type varnish, placing over said impression mold a backing mold adapted to complete a mold cavity, covering the face of said backing mold with a flexible metal foil capable of flexing upon application of a force per unit area, exerted in a direction transverse to its surface, less than the force per unit area, exerted in the opposite direction, which would be necessary to break adhesion of the thermo-plastic to the coated impression face, and injecting the thermo-plastic while hot into said mold cavity and cooling it to a solid resilient condition therein.

4. The method of making patterns for molding plaster and the like which comprises forming a negative impression mold of plaster, forming a vinyl chloride gel thermo-plastic composition in said negative impression mold, before said forming impregnating with montan wax the surface of the mold which is to form the face of the pattern, and treating the surface of the mold which is to form the back of said pattern to make it less adherent to the hot thermo-plastic than the impregnated face.

MORRIS BEAN.

REFERENCES CITED

The following references are of record in the file of this patent:

UNITED STATES PATENTS

| Number | Name | Date |
|---|---|---|
| 2,015,530 | Madge | Sept. 24, 1935 |
| 1,580,966 | Dales et al. | Apr. 13, 1926 |
| 1,600,514 | Seailles et al. | Sept. 21, 1926 |
| 1,665,355 | Gustafson | Apr. 10, 1928 |
| 1,585,348 | Hick et al. | May 18, 1926 |
| 2,272,887 | Allen | Feb. 10, 1942 |

OTHER REFERENCES

"Goodrich Korrgel," publication of B. F. Goodrich Co., New Products Dept., pages 1 and 2.